Oct. 7, 1958
C. BRAMMING
2,855,120
VACUUM BOTTLE WITH HANDLE
Filed July 13, 1956
3 Sheets-Sheet 1
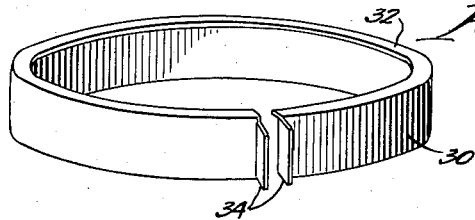
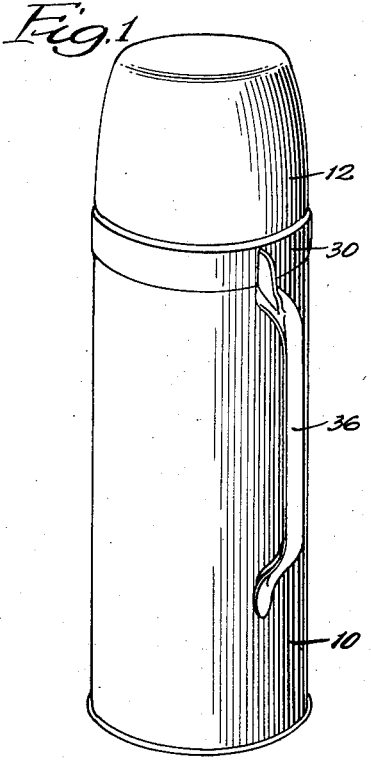
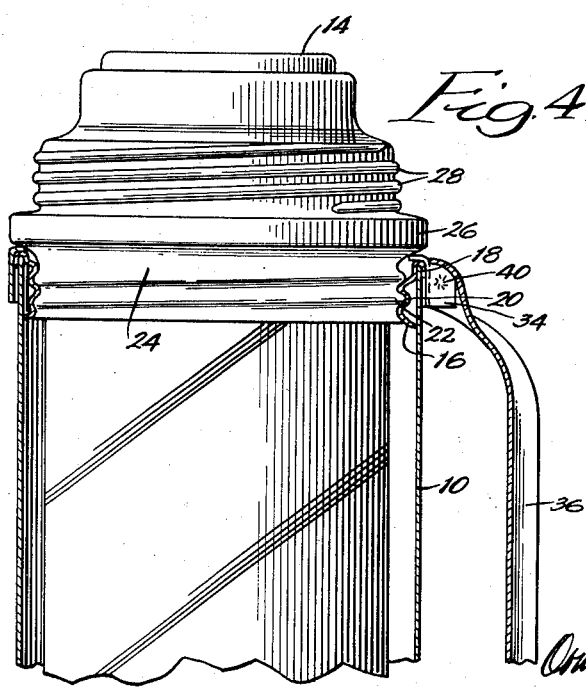
INVENTOR:
Carl Bramming,
BY
Osmus, McDougall, Williams & Hersh,
ATTORNEYS.

Oct. 7, 1958     C. BRAMMING     2,855,120
VACUUM BOTTLE WITH HANDLE
Filed July 13, 1956     3 Sheets-Sheet 2
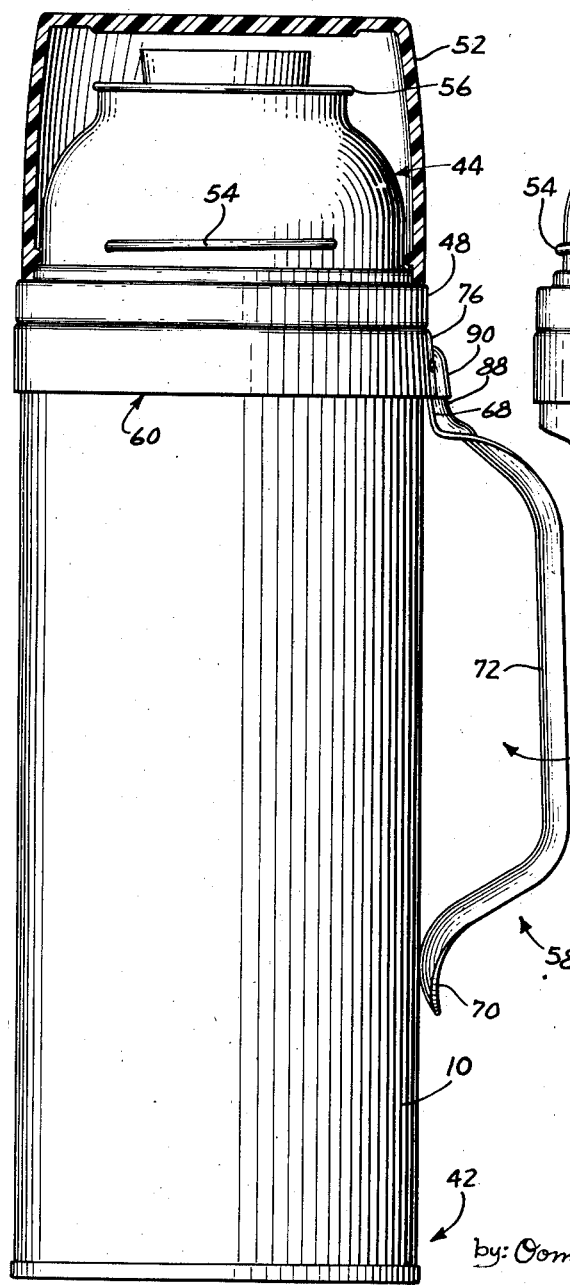
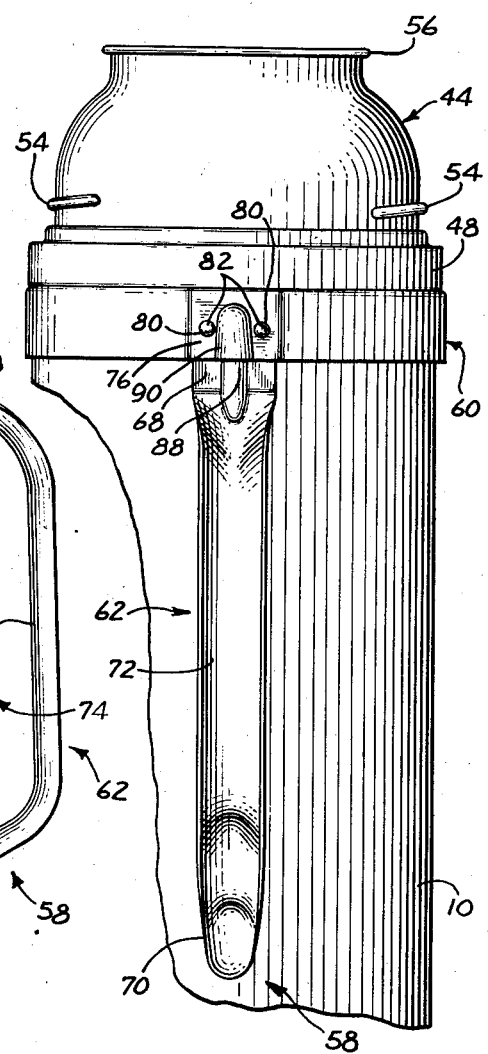
Inventor
CARL BRAMMING
by: Ooms, McDougall, Williams & Hersh
Attys.

Oct. 7, 1958          C. BRAMMING          2,855,120
VACUUM BOTTLE WITH HANDLE
Filed July 13, 1956          3 Sheets-Sheet 3
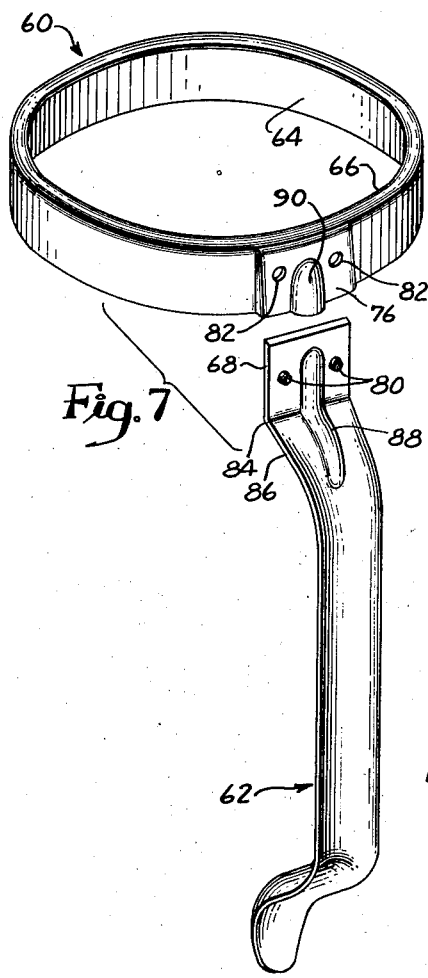
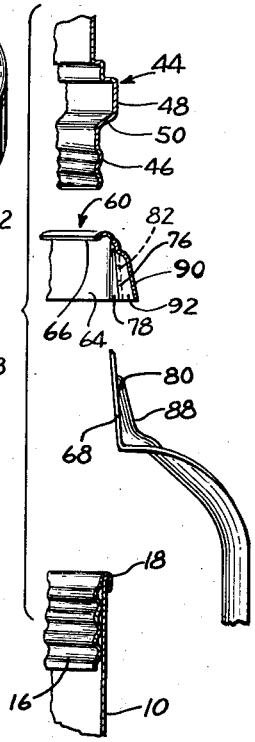
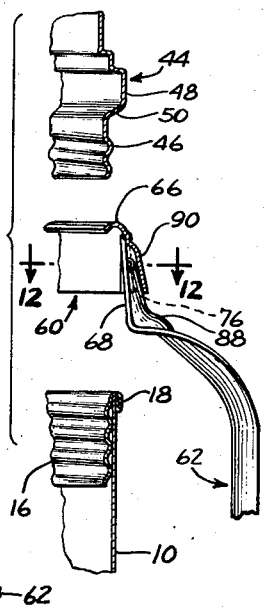
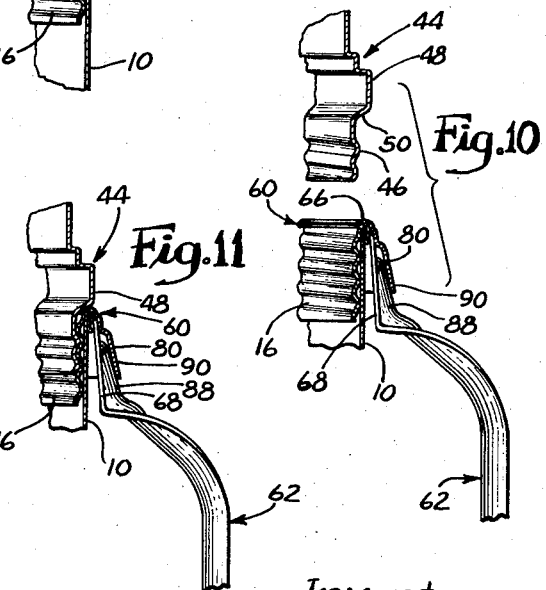
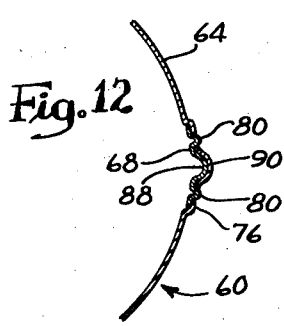
Inventor
CARL BRAMMING
by: Ooms, McDougall, Williams & Hersh
Attys.

2,855,120

United States Patent Office
Patented Oct. 7, 1958

2,855,120

VACUUM BOTTLE WITH HANDLE

Carl Bramming, Nashville, Tenn., assignor to Aladdin Industries, Incorporated, Nashville, Tenn., a corporation of Illinois Application July 13, 1956, Serial No. 597,621

18 Claims. (Cl. 215—13)

This invention relates to vacuum bottles and pertains particularly to new and improved vacuum bottles with handles.

One object of the present invention is to provide a new and improved vacuum bottle with a handle that may be employed in pouring out the contents of the vacuum bottle.

Another object is to provide a new and improved vacuum bottle with a handle that may be grasped in the hand, as in carrying the vacuum bottle or pouring out the contents thereof, or may be hooked over a belt or the like so that the vacuum bottle may be carried without the use of the hands.

A further object is to provide a new and improved vacuum bottle having a handle that will restrain the vacuum bottle from rolling when laid down on its side on a smooth or moving surface.

It is another object to provide a new and improved vacuum bottle having a handle that may readily be detached from and mounted on the vacuum bottle, with the result that the handle may be sold either as a separate attachment or in conjunction with the vacuum bottle.

It is a further object to provide a new and improved handle that will fit on many of the vacuum bottles already in use by the purchasing public or already being sold commercially, so that the handle may be sold as a separate attachment for such vacuum bottles.

A further object is to provide a new and improved vacuum bottle handle which knocks down for compact packaging and shipment, yet may easily be assembled and mounted on a vacuum bottle by the ultimate purchaser.

Another object is to provide such a new and improved handle which is efficient, durable and highly serviceable, yet is simple in construction and low in cost.

Further objects and advantages of the present invention will appear from the following description, taken with the accompanying drawings, in which:

Fig. 1 is a perspective view of one illustrative embodiment of the invention, in the form of a vacuum bottle with a handle.

Fig. 2 is a perspective view showing a handle mounting band embodied in the vacuum bottle of Fig. 1.

Fig. 3 is a perspective view of a handle element embodied in the vacuum bottle of Fig. 1.

Fig. 4 is a fragmentary enlarged elevational sectional view, taken centrally and longitudinally through the upper portion of the vacuum bottle of Fig. 1.

Fig. 5 is a front elevational view of a second illustrative embodiment of the invention, in the form of a vacuum bottle with a modified handle construction, the cap for the vacuum bottle being shown in section for clarity of illustration.

Fig. 6 is a fragmentary side elevational view of the modified vacuum bottle.

Fig. 7 is an exploded perspective view showing a modified handle mounting band and a modified handle element, as embodied in the vacuum bottle of Fig. 3.

Fig. 8 is an exploded fragmentary elevational sectional view showing the collar and jacket of the vacuum bottle and the handle mounting band and handle element, all in disassembled relation.

Fig. 9 is a view similar to Fig. 6, but with the handle element and the handle mounting band in assembled relation.

Fig. 10 is a view similar to Fig. 7, but showing the next stage in the assembly, with the handle, the handle mounting band and the jacket in assembled relation.

Fig. 11 is a fragmentary elevational sectional view similar to Fig. 8 but with all of the components fully assembled.

Fig. 12 is a fragmentary horizontal sectional view taken generally along a line 12—12 in Fig. 7 to show the handle and the handle mounting band in assembled relation.

It will be seen that Figs. 1–4 illustrate a vacuum bottle 9 of the type having an outer protective jacket 10 of metal, plastic, or other rigid material formed into a cylindrical shape or other geometrical contour. A vacuum insulated filler 11, usually of glass or the like, is housed within and protected by the jacket 10. The illustrated jacket 10 is surrounded by and covered with a removable cap 12 which protects the upper end of the fragile vacuum insulated filler 11, when the vacuum bottle is not in use.

Actually, the present invention may be employed in connection with any suitable type of vacuum bottle. However, some of the details of the vacuum bottle 9 will be described by way of example. As shown in Fig. 4, the vacuum bottle 9 has a downwardly extending flange or bushing 16 which is mounted within and crimped to the upper end of the protective jacket, the crimp being shown at 18. The flange or bushing 16 is provided with screw threads 20 which are adapted to mate disengageably with screw threads 22 on the lowermost portion of a collar 24, adapted to close the top of the jacket 10 and protect the upper end of the vacuum insulated filler 9. As shown, the collar 24 has an enlarged shoulder 26 above and adjacent the screw threads 22. The collar 24 is also provided with screw threads 28 which are adapted to mate with internal screw threads (not shown) on the protective cap 12 to provide for a tight closure between the cap 12 and the jacket 10.

The vacuum bottle 9 of Figs. 1–4 is provided with a handle 29 which comprises an annular handle mounting band 30, preferably made of resilient metal, and adapted to be mounted on the vacuum bottle. As its upper edge, the mounting band 30 is provided with an inturned annular lip or flange 32 which is adapted to surmount the top of the protective jacket 10, above the crimped upper edge 18 of the flange or bushing 16. Thus, when the collar 24 is mated with the bushing 16, the annular lip or flange 32 on the band 30 is clamped between the enlarged shoulder 26 on the collar and the upper end of the protective jacket 10. In this way, the band 30 is rigidly secured on the vacuum bottle 9.

In the construction of Figs. 1–4, the mounting band 30 is provided with outwardly turned tabs 34 which are adapted to be secured to a handle element 36. More specifically, the tabs 34 are received between and spot welded or otherwise rigidly secured to a pair of spaced apart walls 38, formed on the upper end of the handle element 36. Thus, the spot welding is indicated at 40. The handle is preferably made of resilient metal and of a curvilinear design wherein the bottom portion of the handle is turned inwardly so that it abuts or nearly abuts the protective jacket 10.

It will be understood that the handle unit 29 may readily be removed from the vacuum bottle 9 by unscrewing the collar 24. The handle unit 29 may be sold separately or in conjunction with the vacuum bottle, It will be apparent that the handle unit may be dimensioned to fit on many of the vacuum bottles already in use or on sale.

The handle unit provides convenient means whereby the vacuum bottle may be carried or held, and whereby the contents of the bottle may be poured out. In addition, the handle may be hooked over a belt or into a pocket or the like so as to support the vacuum bottle without the use of the hands. Furthermore, the handle will prevent the vacuum bottle from rolling when it is placed on a smooth or moving surface.

These advantages are also achieved by the modified construction shown in Figs. 5-12. In this case, the invention is embodied in a vacuum bottle 42, which may have the same protective jacket 10 and bushing 16 as in Figs. 1-4. It will be seen that the vacuum bottle 42 has a slightly modified collar 44, which, however, has an externally threaded lower portion 46 adapted to be screwed into the bushing 16, as in the first embodiment. Immediately above the threaded portion 46 is an enlarged portion 48 which defines a downwardly facing shoulder 50, adapted to engage the crimped upper edge 18 of the bushing 16 at the upper end of the jacket 10. As shown in Fig. 5, the vacuum bottle 42 is fitted with an internally threaded, removable cap 52 which is adapted to be screwed onto segmental threads 54, formed on the collar above the enlarged portion 48. In this instance, the upper end of the collar 44 is formed outwardly into an annular pouring lip 56. It will be understood, however, that these variations in the collar are not material to the present invention. Actually, for the purposes of the present invention, any suitable collar may be employed.

The vacuum bottle 42 of Figs. 5-12 is provided with a modified handle unit 58, which comprises a mounting band 60 and a handle element 62. In this case, the mounting band 60 is continuous and unbroken. The band 60 has a main or body portion 64 which is annular and generally cylindrical in form. At its upper end, the band 60 terminates in an inwardly turned flange or lip 66 of curved, hook-like form. The band 60 is adapted to be slipped over the top of the jacket 10 so that the flange 66 will engage the top of the crimped upper edge 18.

It will be seen that the handle element 62 is formed with upper and lower portions 68 and 70, together with a main, intermediate body portion 72 which is offset outwardly from the portions 68 and 70 to provide an opening 74 for insertion of a hand between the handle 62 and the jacket 10.

Interlocking, disengageable elements are provided on the mounting band 60 and the handle 62 to secure the handle 62 in place on the vacuum bottle 42. In this instance, the upper end portion 68 of the handle 62 is in the form of a generally flat, spade-like blade. At one point, the mounting band 60 has an outwardly formed portion 76 which defines a pocket 78 adapted to receive the upper end portion 68 on the handle 62. The pocket 78 opens downwardly but is closed at its upper end.

To retain the blade portion 68 in the pocket 78, one or more projections 80 are formed on the blade 68 and are adapted to be received in openings 82 or the like in the outwardly formed element 76 on the mounting band 60. In this instance there are two of the projections 80 and two apertures 82. It will be seen from Fig. 12 that the projections 80 extend outwardly into the openings 82. It will be realized that the positions of the projections and apertures might well be reversed, with the projections extending inwardly from the offset portion 76.

At the lower end of the blade-like upper portion 68, the handle 62 has an outward bend 84 which merges into an outwardly extending portion 86 connected to the body portion 72 of the handle. As shown, an outwardly formed rib 88 extends centrally along the handle 62 in a vertical direction. The rib 88 extends partway up the blade 68 and partway down the outwardly extending portion 86 so as to reinforce the handle at the bend 84. To receive the upper end of the rib 88, a corresponding rib 90 is formed on the pocket wall portion 76 of the mounting band 60. Within the rib 90 is a channel or pocket element 92 adapted to receive the upper end of the rib 88. The engagement of the rib 88 with the channel forming element 90 is effective to prevent lateral displacement of the handle 62, with respect to the mounting band 60.

When the handle 62 and the mounting band 60 are in place on the vacuum bottle 42, the upper end of the blade portion 68 engages the crimped edge 18 at the upper end of the jacket 10. In this instance, the blade portion 68 angles or slants outwardly from the jacket 10 so that the greater portion of the blade 68 is spaced outwardly from the jacket. The pocket wall 76 angles outwardly to a corresponding extent so that it will engage the blade 68 for substantially the entire length of the wall 76 from top to bottom. The lower end portion 70 of the handle 62 preferably engages the jacket 10. In this way, the handle 62 is held securely and tightly on the vacuum bottle 42. There is firm engagement between the extreme upper end of the handle 62 and the upper end of the jacket 10, the outer side of the blade 68 and the inner side of the pocket wall 76, and the lower end portion 70 of the handle and the outer surface of the jacket 10. Any looseness between the handle and the vacuum bottle is thus prevented.

The handle unit 58 may be removed from the vacuum bottle 42 by unscrewing the collar 44 from the jacket 10 and lifting off the mounting band 60. It will be apparent that the handle 62 is then readily separable from the mounting band 60. The handle unit 58 may be mounted on the vacuum bottle 42 by placing the blade portion 68 of the handle in the pocket 78 so that the pimple-shaped projections 80 will extend outwardly into the openings 82 in the mounting band 60. The mounting band is then slipped over the top of the jacket. Finally, the collar 44 is screwed into the upper end of the jacket so that the lip or flange 66 on the mounting band will be clamped between the jacket and the collar. The handle 62 is retained in the pocket 78 by the engagement between the jacket and the upper and lower end portions of the handle. Downward displacement of the handle is prevented by the interlocking action between the projections 80 and the openings 82. The engagement between the rib 88 and the channel 90 tends to prevent the handle from being swingable from side to side. Thus, the handle is held securely and firmly on the vacuum bottle, without any looseness.

It will be evident that each of the illustrated handles is conveniently located for use in lifting the vacuum bottle and pouring out the contents thereof. The handle may also be employed for carrying the vacuum bottle in the hand. In addition, the handle may be hooked or clipped over a belt or the like or into a pocket. Thus the vacuum bottle may be carried without the use of the hands. The handle also prevents the vacuum bottle from rolling to any great extent when placed on a smooth surface. Either handle may readily be mounted on and removed from the vacuum bottle. Thus, the handle unit may be sold separately for use on existing vacuum bottles. The handle of Figs. 5-12 separates into two parts for compact packaging and shipment.

Various modifications, alternative constructions and equivalents may be employed without departing from the true spirit and scope of the invention as exemplified in the foregoing description and defined in the following claims.

I claim:

1. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally annular handle mounting member retained between said opposed annular elements, and a handle connected to said mounting member for use in holding said vacuum bottle.

2. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a handle mounting band having a generally smooth and cylindrical body portion received around said vacuum bottle and an inner flange portion projecting inwardly from said body portion and retained between said opposed annular elements, and a handle connected to said band for use in holding said vacuum bottle.

3. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a handle mounting band having a generally smooth and cylindrical skirt portion received around said jacket and an inwardly projecting flange portion at the upper end of said skirt portion and retained between said opposed annular elements, and a handle connected to said band for use in holding said vacuum bottle.

4. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally annular handle mounting member retained between said opposed annular elements, and a handle connected to said mounting member and extending downwardly and outwardly therefrom, said handle having an inwardly directed lower end portion in juxtaposition with the outside of said jacket.

5. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a handle mounting band having a generally smooth cylindrical skirt portion received around the upper end of said jacket and an inwardly projecting flange portion at the upper end of said skirt portion and retained between said opposed annular elements, and a handle connected to said band on one side thereof and extending outwardly and downwardly therefrom, said handle having an inwardly extending lower end portion in juxtaposition with the outer surface of said jacket.

6. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a discontinuous handle mounting band having a substantially smooth cylindrical lower portion received over the upper end of said jacket and an inwardly projecting flange portion at the upper end of said skirt portion and retained between said opposed annular elements, said band having a pair of end portions formed outwardly in abutting generally vertical and radial lugs, and a handle having a channel-shaped upper end portion defining a pair of closely spaced generally radial walls straddling said abutting lugs and rigidly secured thereto.

7. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally cylindrical band having an inwardly directed flange at the upper end thereof and retained between said opposed annular elements, said band having an outwardly formed pocket wall portion defining a downwardly opening pocket between said band and said jacket, a handle received in said pocket, and interlocking elements on said handle and said pocket wall element and disengageably retaining said handle in said pocket.

8. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally cylindrical band having an inwardly directed flange at the upper end thereof and retained between said opposed annular elements, said band having an outwardly formed pocket wall portion defining a downwardly opening pocket between said band and said jacket, a handle disengageably received in said pocket, an opening in said pocket wall element, and a projection on said handle extending into said opening and disengageably retaining said handle in said pocket.

9. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally cylindrical band having an inwardly directed flange at the upper end thereof and retained between said opposed annular elements, said band having an outwardly formed pocket wall portion defining a downwardly opening pocket between said band and said jacket, a handle disengageably received in said pocket, locking means disengageably retaining said handle in said pocket, a rib on said handle and extending into said pocket, and a channel element on said pocket wall element and disengageably receiving said rib.

10. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally cylindrical band having an inwardly directed flange at the upper end thereof and retained between said opposed annular elements, said band having an outwardly formed pocket wall portion defining a downwardly opening pocket between said band and said jacket, a handle disengageably received in said pocket, a plurality of openings in said pocket wall element, and a plurality of projections on said handle and extending outwardly into said openings for disengageably retaining said handle in said pocket.

11. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally cylindrical band having an inwardly directed flange at the upper end thereof and retained between said opposed annular elements, said band having an outwardly formed pocket wall portion defining a downwardly opening pocket between said band and said jacket, a handle having an upper end portion disengageably received in said pocket and engaging the upper end of said jacket and said pocket wall element, and interlocking means on said handle and said pocket wall element and disengageably retaining said handle in said pocket, said handle extending outwardly and downwardly from said band and having an inwardly directed lower end portion engaging the outer surface of said jacket.

12. In a vacuum bottle, the combination comprising a vacuum insulated receptacle, a protective jacket received around the lower portion of said receptacle, a collar disengageably connected to the upper end of said jacket and disposed around the upper portion of said receptacle, said collar and said jacket having opposed annular elements thereon movable into clamping relation, a generally cylindrical band having an inwardly directed flange at the upper end thereof and retained between said opposed annular elements, said band having an outwardly formed pocket wall portion defining a downwardly opening pocket between said band and said jacket, a handle having an upper end portion disengageably received in said pocket and engaging the upper end of said jacket and said pocket wall element, said pocket wall element having a plurality of openings therein, a plurality of projections on said handle and extending outwardly into said openings, a generally vertical rib on said handle and extending into said pocket, and a channel element on said pocket wall element and disengageably receiving said rib, said handle extending downwardly and outwardly from said band and having an inwardly extending lower end portion engaging the outside of said jacket.

13. A handle unit for a vacuum bottle having a vacuum insulated receptacle with a jacket therearound and a collar disengageably connected to the upper end of the jacket, said handle unit comprising a substantially circular band having a generally smooth and cylindrical body portion, said band having an inturned flange portion at one end thereof and disengageably receivable in clamped relation between the collar and the jacket, and a handle connected to said band.

14. A handle unit for a vacuum bottle having a vacuum insulated receptacle with a jacket therearound and a collar disengageably connected to the upper end of the jacket, said handle unit comprising a generally smooth cylindrical band receivable over the upper end of the jacket and having an inwardly directed flange portion at the upper end of said band and disengageably receivable in clamped relation between the collar and the jacket, and a handle connected to said band.

15. A handle unit for a vacuum bottle having a vacuum insulated receptacle with a jacket therearound and a collar disengageably connected to the upper end of the jacket, said handle unit comprising a generally smooth cylindrical band receivable over the upper end of the jacket and having an inwardly directed flange portion at the upper end of said band and disengageably receivable in clamped relation between the collar and the jacket, and a handle having an upper end portion connected to said band, said handle extending downwardly and outwardly from said band and having a lower end portion extending inwardly to a point substantially in vertical alignment with said upper end portion.

16. A handle unit for a vacuum bottle having a vacuum insulated receptacle with a jacket therearound and a collar disengageably connected to the upper end of the jacket, said handle unit comprising a generally smooth cylindrical band receivable over the upper end of the jacket, said band being discontinuous and having a pair of end portions formed outwardly into abutting generally vertical and radial lugs, and a handle having a channel-shaped portion providing a pair of closely spaced generally radial walls straddling said abutting lugs and rigidly secured thereto.

17. A handle unit for a vacuum bottle having a vacuum insulated receptacle with a jacket therearound and a collar disengageably connected to the upper end of the jacket, said handle unit comprising a generally smooth cylindrical band receivable over the upper end of the jacket, said band being discontinuous and having a pair of end portions formed outwardly into abutting generally vertical and radial lugs, and a depending handle having a channel-shaped upper end portion defining a pair of closely spaced generally radial walls straddling said abutting lugs and rigidly secured thereto, said handle extending downwardly and outwardly from said band and having a lower end portion extending inwardly to a point generally in vertical alignment with said band.

18. A handle unit for a vacuum bottle having a vacuum insulated receptacle with a jacket therearound and a collar disengageably connected to the upper end of the jacket, said handle unit comprising a generally smooth cylindrical band receivable over the upper end of the jacket, said band having an outwardly formed pocket wall element defining a pocket therein, a handle having an upper end portion disengageably receivable in said pocket, said pocket wall element having a plurality of openings therein, said handle having a plurality of projections extending outwardly and receivable in said openings, a generally vertical rib on said handle, and a channel element on said pocket wall element for receiving said rib, said handle extending outwardly and downwardly from said upper end portion thereof and having a lower end portion extending inwardly to a point generally in vertical alignment with said upper end portion.

References Cited in the file of this patent

UNITED STATES PATENTS

| 2,069,037 | Jedlicka | Jan. 26, 1937 |
| 2,626,174 | Barber | Jan. 20, 1953 |

FOREIGN PATENTS

| 466,985 | Canada | Aug. 1, 1950 |